(12) United States Patent
Yao

(10) Patent No.: US 8,663,049 B1
(45) Date of Patent: Mar. 4, 2014

(54) SPEED REDUCER

(71) Applicant: Tsun-Tien Yao, Taichung (TW)

(72) Inventor: Tsun-Tien Yao, Taichung (TW)

( * ) Notice: Subject to any disclaimer, the term of this patent is extended or adjusted under 35 U.S.C. 154(b) by 0 days.

(21) Appl. No.: 13/686,921

(22) Filed: Nov. 28, 2012

(51) Int. Cl.
*F16H 3/70* (2006.01)
*F16H 1/32* (2006.01)

(52) U.S. Cl.
USPC .......................................... 475/178; 475/170

(58) Field of Classification Search
USPC ................................................ 475/170–180
See application file for complete search history.

(56) References Cited

U.S. PATENT DOCUMENTS

| 2007/0167268 A1* | 7/2007 | Fujimoto et al. | 475/170 |
| 2009/0075771 A1* | 3/2009 | Tesar | 475/5 |
| 2012/0108381 A1* | 5/2012 | Nakamura | 475/180 |

* cited by examiner

*Primary Examiner* — Tisha Lewis

(57) ABSTRACT

A speed reducer includes a rotation member including internal main rollers; a rear carrier including a central through hole and eccentric stepped-diameter holes; a front carrier including a central through hole and recesses; a front wheel including a first through hole, second through holes, and front rollers on an edge to be in contact with the main rollers; a rear wheel including a third through hole, fourth through holes, and rear rollers on an edge to be in contact with the main rollers; coupling members for holding the front carrier, the front wheel, the rear wheel, and the rear carrier together; outer gear assemblies each rotatably disposed in the eccentric stepped-diameter hole, the fourth through hole, the second through hole, and the recess; and a central gear unit being in gear mesh with the outer gear assemblies.

5 Claims, 6 Drawing Sheets

SPEED REDUCER

BACKGROUND OF THE INVENTION

1. Field of the Invention

The invention relates to motion transmitting and speed reduction devices and more particularly to a speed reducer.

2. Description of Related Art

A conventional speed reducer is comprised of a casing, a high speed shaft connecting to an eccentric rod having a plurality of different, hollow pinion rollers, a plurality of low speed shaft pins rotatably disposed in the pinion rollers respectively and each having one end opposite to the high speed shaft and connected to the low speed shaft, a gear roller retaining ring mounted on the pinion rollers for confining the pinion rollers, and a plurality of ring gear pins each enveloped with a ring gear roller for rotatably engaging with the hollow pinion rollers and each having both ends connecting to an inner surface of the casing. Rotation of the eccentric rod rotates the pinion rollers about the ring gear pins to actuate the low speed shaft pins so as to rotate in the pinion rollers for speed reduction.

However, the conventional speed reducer is disadvantageous due to complicated construction, bulkiness, low efficiency, and high manufacturing cost. Thus, the need for improvement still exists.

SUMMARY OF THE INVENTION

It is therefore one object of the invention to provide a speed reducer comprising a sleeve-like rotation member having front and rear ends open, the rotation member comprising a plurality of equally spaced main rollers disposed on an inner surface; a disc-shaped rear carrier comprising a central through hole and a plurality of eccentric stepped-diameter holes equally spaced around the central through hole and connecting each other; a disc-shaped front carrier comprising a central through hole and a plurality of recesses equally spaced around the central through hole thereof; a first bearing assembly disposed between the rotation member and the rear carrier; a second bearing assembly disposed between the rotation member and the front carrier; a front wheel comprising a first through hole, a plurality of second through holes equally spaced around the first through hole, and a plurality of front rollers equally spaced on a circular edge of the front wheel, the front rollers being in contact with the main rollers; a rear wheel comprising a third through hole, a plurality of fourth through holes equally spaced around the third through hole, and a plurality of rear rollers equally spaced on a circular edge of the rear wheel, the rear rollers being in contact with the main rollers; a plurality of coupling members for holding the front carrier, the front wheel, the rear wheel, and the rear carrier together; a plurality of outer gear assemblies each rotatably disposed in the eccentric stepped-diameter hole, the fourth through hole, the second through hole, and the recess; and a central gear unit rotatably disposed through the central hole of the rear carrier, the third through hole, the first through hole, and the central through hole of the front carrier to be in gear mesh with the outer gear assemblies; wherein the numbers of the recesses, the eccentric stepped-diameter holes, the second through holes, the fourth through holes, and the outer gear assemblies are the same; and wherein a rotation of the central gear unit rotates the outer gear assemblies which in turn rotate both the front and rear wheels so as to rotate the rotation member.

The above and other objects, features and advantages of the invention will become apparent from the following detailed description taken with the accompanying drawings.

DETAILED DESCRIPTION OF THE INVENTION

Figure 1:
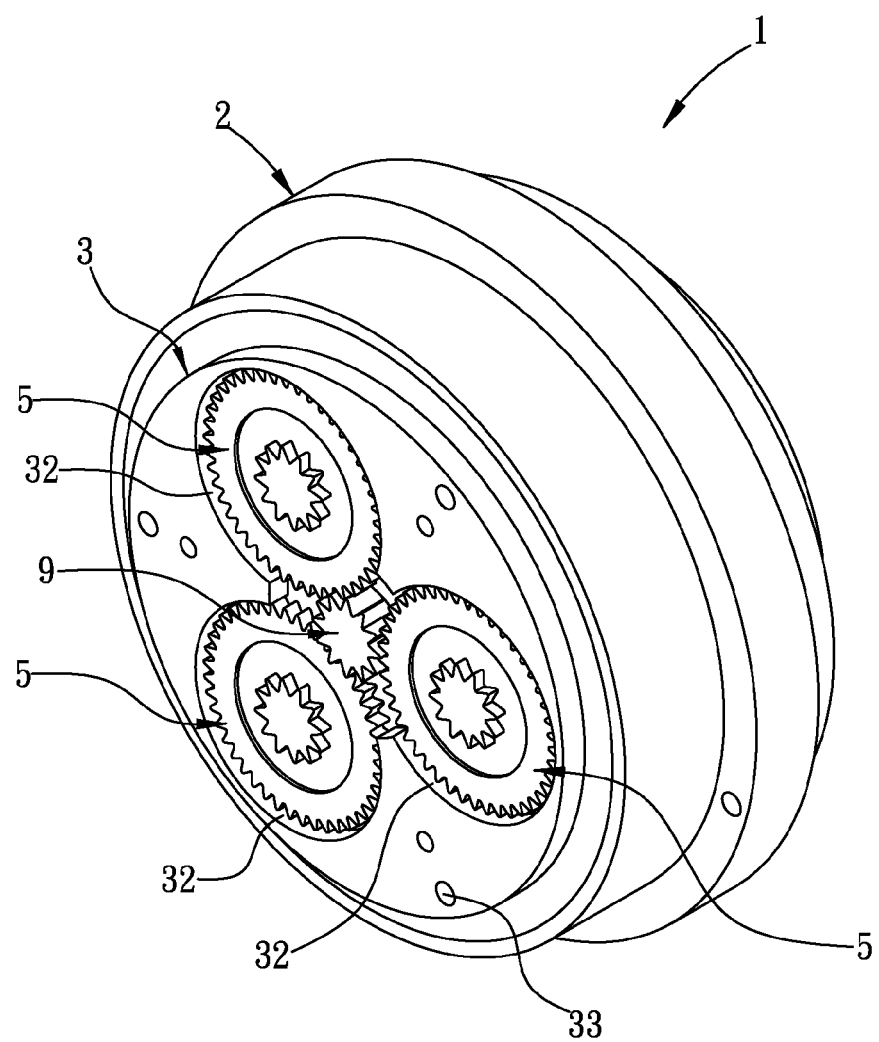
FIGS. 1 and 2 are two perspective views of a speed reducer according to the invention respectively.
Figure 2:
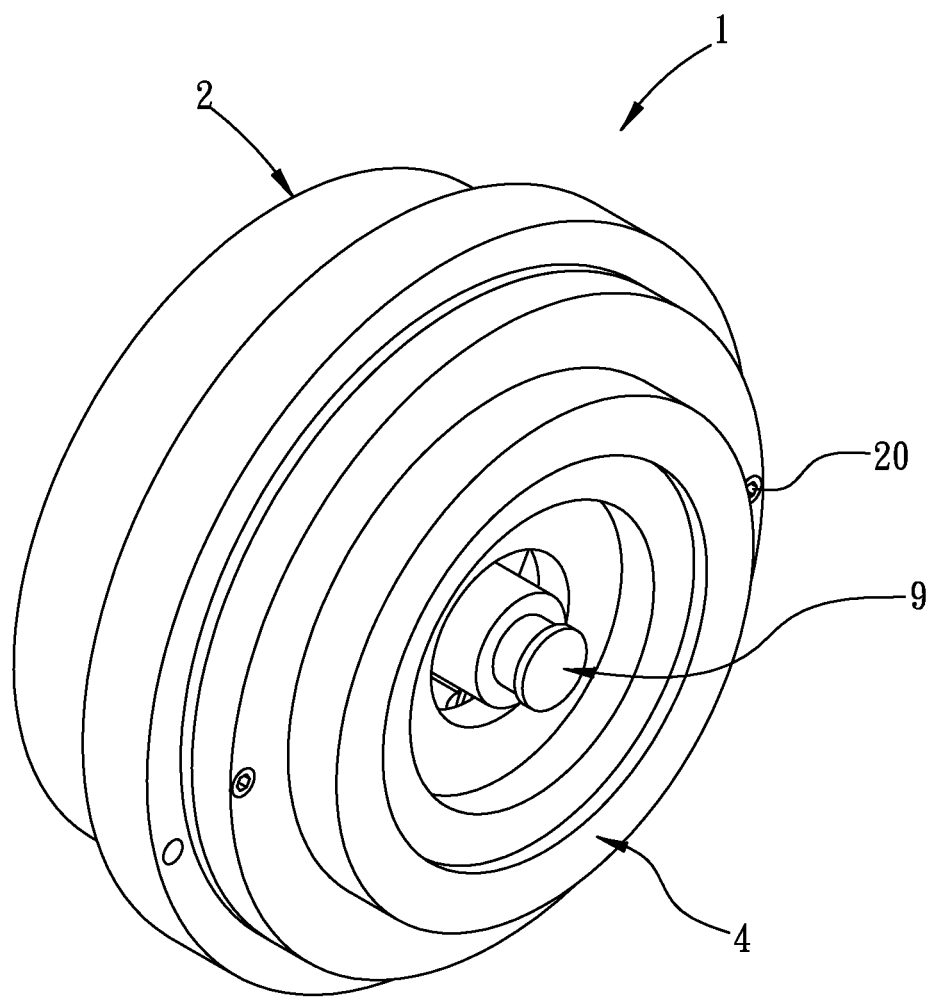
Figure 3:
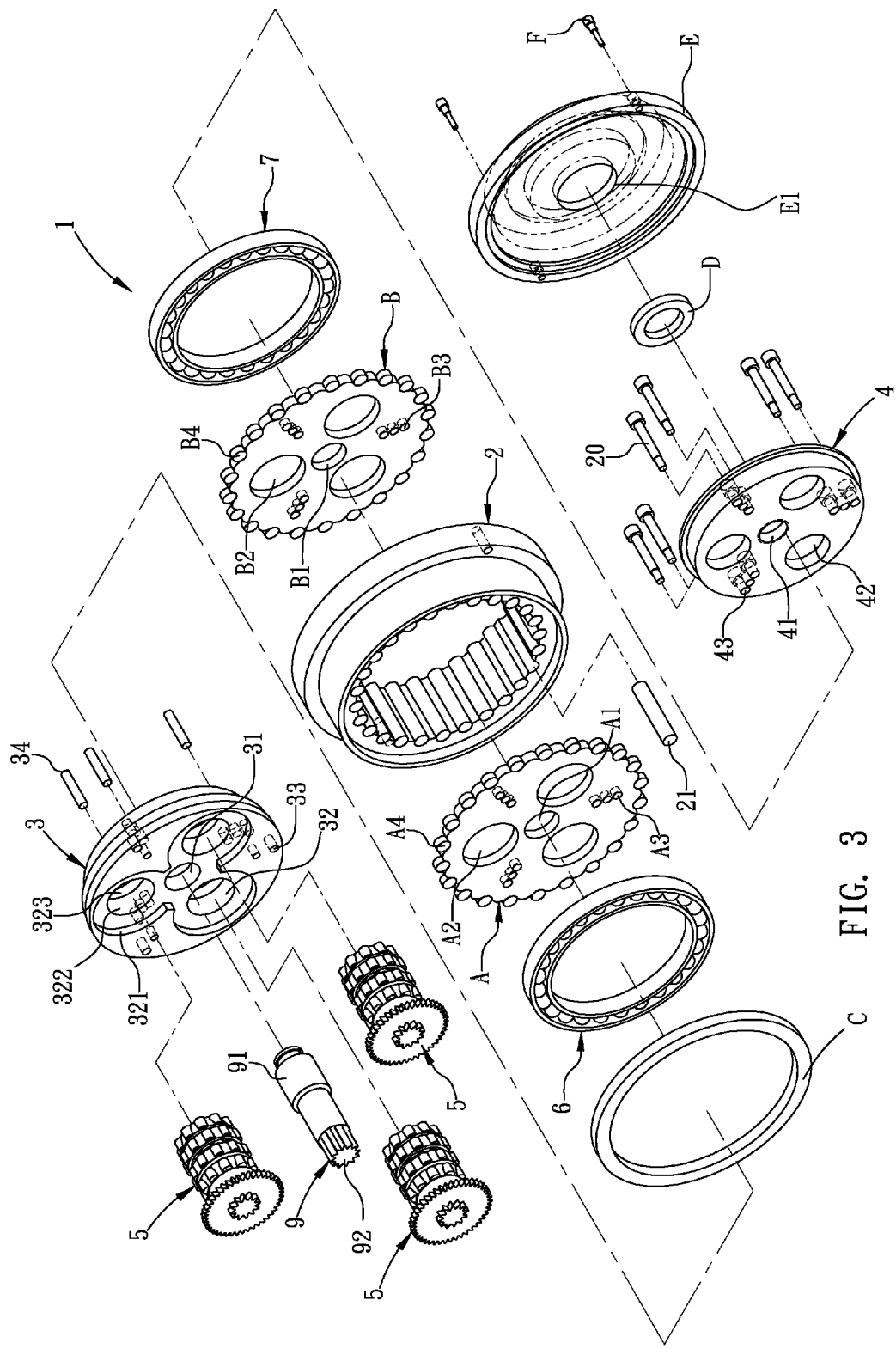
FIG. 3 is an exploded view of the speed reducer.
Figure 4:
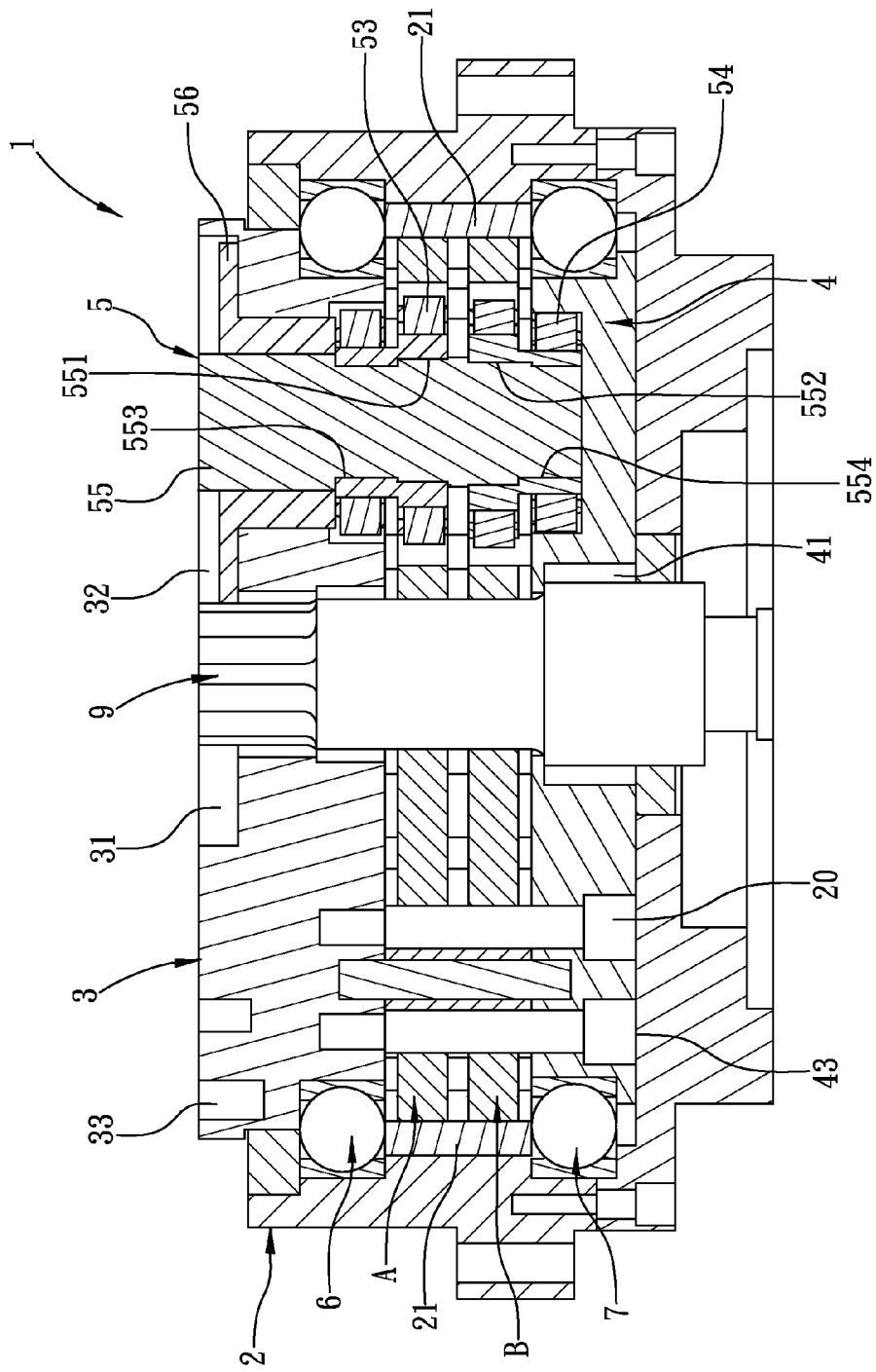
FIG. 4 is a longitudinal sectional view of the speed reducer.
Figure 5:
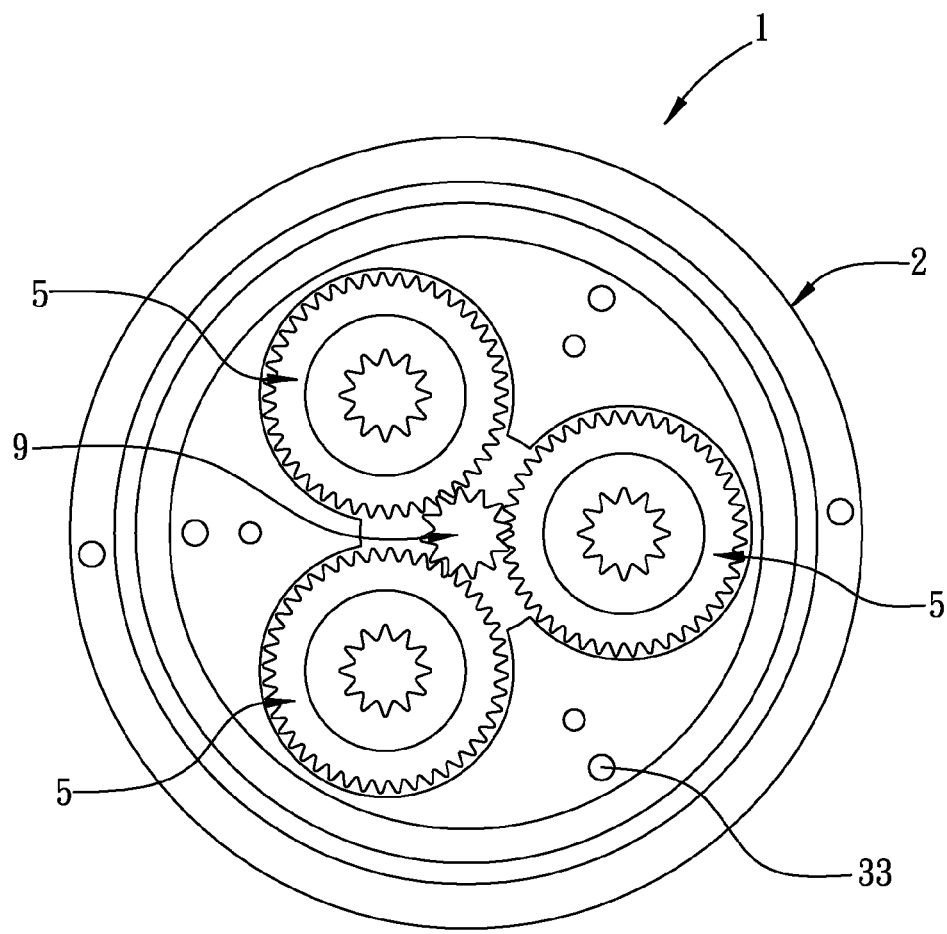
FIG. 5 is a front view of the speed reducer.

Referring to FIGS. 1 to 6, a speed reducer 1 in accordance with the invention comprises a sleeve-shaped rotation member 2, a rear carrier 3, a front carrier 4, three outer gear assemblies 5, a third bearing assembly 6, a fourth bearing assembly 7, a rear wheel A, and a front wheel B. Each component will be discussed in detail below.

The rotation member 2 has a front end provided with the front carrier 4 and a rear end provided with the rear carrier 3. The rotation member 2 comprises a plurality of equally spaced, elongated rollers 21 rotatably disposed on an inner surface.

The disc-shaped rear carrier 3 comprises a central through hole 31, three stepped-diameter holes 32 equally spaced around the through hole 31 and connecting each other, each hole 32 including an outer recess 321, an eccentric, intermediate recess 322, and an inner recess 323, a plurality of sets of a plurality of holes 33, each set of holes 33 being disposed on a front surface or a rear surface of the rear carrier 3 and between any two adjacent holes 32, and a plurality of coupling pins 34.

The disc-shaped front carrier 4 comprises a central through hole 41 having a narrow mouth facing the rear carrier 3, three recesses 42 equally spaced around the through hole 41, and a plurality of sets of a plurality of holes 43, each set of holes 43 being disposed on a front surface or a rear surface of the front carrier 4 and between any two adjacent recesses 42. The number of the holes 32 is equal to that of the recesses 42 and the number of the holes 33 is equal to that of the holes 43.

The third bearing assembly 6 is disposed between the rotation member 2 and the rear carrier 3. A snap ring C is provided between the rotation member 2 and the rear carrier 3 to conceal the third bearing assembly 6. The fourth bearing assembly 7 is disposed between the rotation member 2 and the front carrier 4.

The front wheel B comprises a central first through hole B1, three second through holes B2 equally spaced around the first through hole B1, and three sets of three third through holes B3, each set of third through holes B3 being disposed between any two adjacent second through holes B2, and a plurality of rollers B4 equally spaced on a circular edge of the front wheel B. The rollers B4 are disposed in a front portion of the bore of the rotation member 2 to engage with the rollers 21.

The rear wheel A is a mirror image of the front wheel B and comprises a central first through hole A1, three second through holes A2 equally spaced around the first through hole A1, and three sets of three third through holes A3, each set of third through holes A3 being disposed between any two adjacent second through holes A2, and a plurality of rollers A4 equally spaced on a circular edge of the rear wheel A. The rollers A4 are disposed in a rear portion of the bore of the rotation member 2 to engage with the rollers 21. Further, the rollers A4 are spaced from the rollers B4.

Each of the coupling pins 34 is fitted in the aligned hole 33, the third through hole A3, the third through hole B3, and the hole 43 to hold the rear carrier 3, the rear wheel A, the front wheel B, and the front carrier 4 in place. Further, a plurality of fasteners 20 are disposed through the hole 43, the third through hole B3, the third through hole A3, and the hole 33 to hold the rear carrier 3, the rear wheel A, the front wheel B, and the front carrier 4 in place.

A plurality of fasteners F are driven through a shallow cup shaped cover E into the rotation member 2. An adapting ring D is disposed in a central through hole E1 of the cover E. The outer gear assembly 5 is provided through the hole 32, the second through hole A2, the second through hole B2, and into the recess 42.

Figure 6:
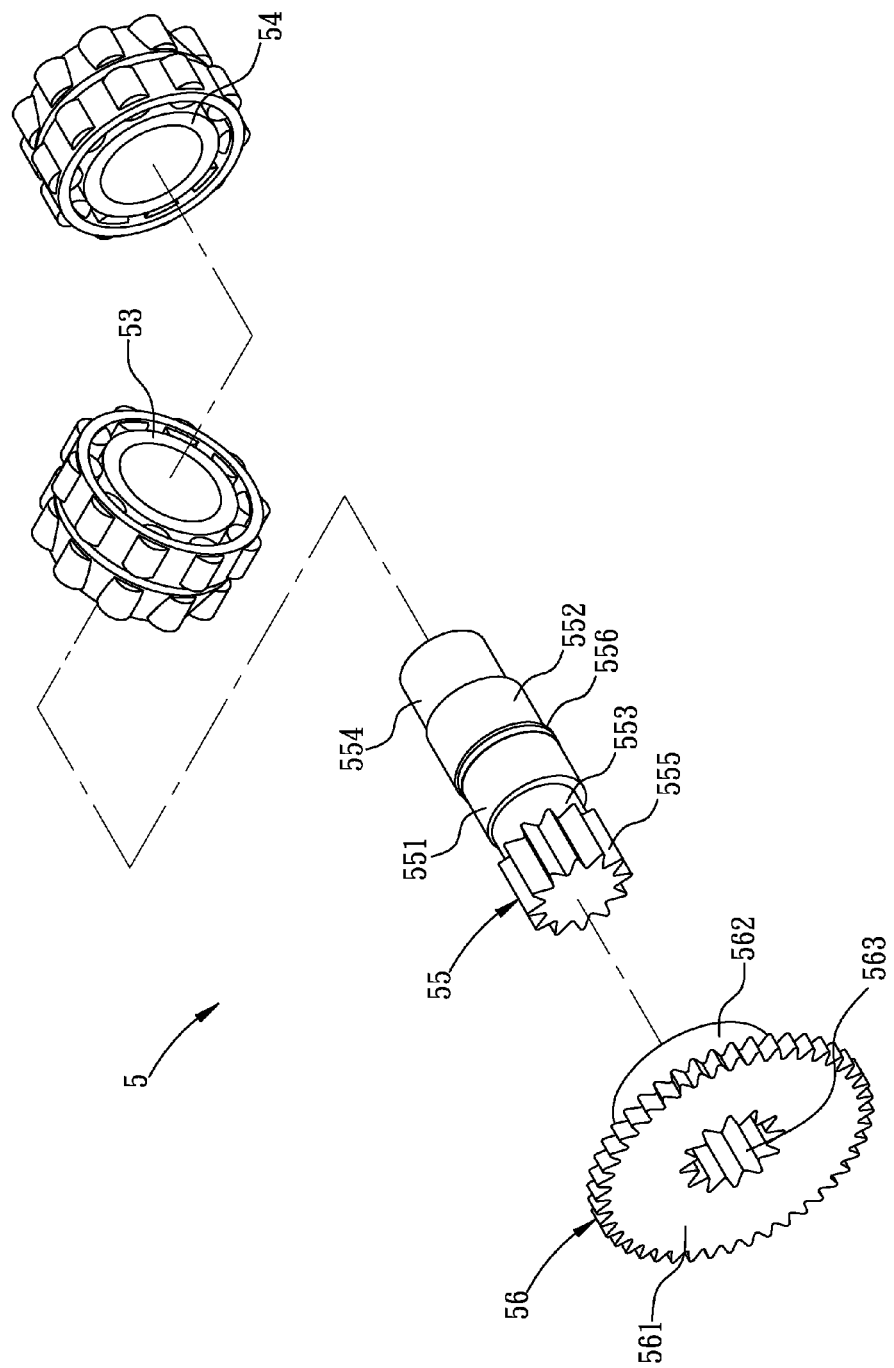
FIG. 6 is an exploded view of the outer gear assembly.

As shown in FIG. 6 specifically, the outer gear assembly 5 comprises a stepped diameter shaft 55 including, from a rear end to a front end, a gear section 555, a first shank section 553, a second shank section 551, an annular flange 556, a third shank section 552, and a fourth shank section 554; a first bearing assembly 53 disposed on both the first and second shank sections 553 and 551; and a second bearing assembly 54 disposed on both the third and fourth shank sections 552 and 554. The first and second bearing assemblies 53 and 54 are spaced from each other by the flange 556. The outer gear assembly 5 further comprises a gear train 56 including a forward sleeve 562, a rear gear 561, and internal teeth 563 through the sleeve 562 and the gear 561. The gear section 555 is disposed through the teeth 563 and in gear mesh with the teeth 563. A rear end of the gear section 555 is further exposed. The first, second, third and fourth shank sections 551, 552, 553 and 554 are disposed in the inner recess 323, the second through hole A2, the second through hole B2, and the recess 42. The gear 561 is seated on the outer recess 321. But the outer recess 321 is not completely covered by the gear 561 due to the eccentric, intermediate recess 322. Thus, the gear 561 (i.e., the outer gear assembly 5) is eccentric.

The central gear unit 9 comprises a stepped-diameter shank 91 disposed through the hole 31, the first through hole A1, the first through hole B1, the hole 41, and the adapting ring D, and a gear section 92 at one open end, the gear section 92 being meshed with the gears 561. The central gear unit 9 is implemented as a drive shaft of a motor (not shown).

A rotation of the central gear unit 9 rotates the gear trains 56 which in turn rotates both the front and rear wheels B and A. Further, the rollers B4 and A4 rotate to rotate the rotation member 2 by rotatably engaging with the rollers 21.

In an exemplary example, it is supposed that the central gear unit 9 has 12 teeth and a rotation speed of 300 revolutions per minute (rpm). The gear train 56 (i.e., the gear 561) has 36 teeth. A gear ratio (GR) is 36 divided by 12, i.e., 3. A gear reduction ratio (GRR) is an inverse of GR, i.e., about 0.33. Thus, a reduction is about 1:3. That is, the rotation speed of each outer gear assembly 5 is decreased to 100 rpm.

In short, the invention has the advantages of larger reduction ratio and higher torque-to-weight ratio.

While the invention has been described in terms of preferred embodiments, those skilled in the art will recognize that the invention can be practiced with modifications within the spirit and scope of the appended claims.

What is claimed is:

1. A speed reducer comprising:
   a sleeve-shaped rotation member having front and rear ends open, the rotation member comprising a plurality of equally spaced main rollers disposed on an inner surface;
   a disc-shaped rear carrier comprising a central through hole and a plurality of eccentric stepped-diameter holes equally spaced around the central through hole and connecting each other;
   a disc-shaped front carrier comprising a central through hole and a plurality of recesses equally spaced around the central through hole thereof;
   a first bearing assembly disposed between the rotation member and the rear carrier;
   a second bearing assembly disposed between the rotation member and the front carrier;
   a front wheel comprising a first through hole, a plurality of second through holes equally spaced around the first through hole, and a plurality of front rollers equally spaced on a circular edge of the front wheel, the front rollers being in contact with the main rollers;
   a rear wheel comprising a third through hole, a plurality of fourth through holes equally spaced around the third through hole, and a plurality of rear rollers equally spaced on a circular edge of the rear wheel, the rear rollers being in contact with the main rollers;
   a plurality of coupling members for holding the front carrier, the front wheel, the rear wheel, and the rear carrier together;
   a plurality of outer gear assemblies each rotatably disposed in the eccentric stepped-diameter hole, the fourth through hole, the second through hole, and one of the recesses; and
   a central gear unit rotatably disposed through the central hole of the rear carrier, the third through hole, the first through hole, and the central through hole of the front carrier to be in gear mesh with the outer gear assemblies;
   wherein the numbers of the recesses, the eccentric stepped-diameter holes, the second through holes, the fourth through holes, and the outer gear assemblies are the same; and
   wherein a rotation of the central gear unit rotates the outer gear assemblies which in turn rotate both the front and rear wheels so as to rotate the rotation member.

2. The speed reducer of claim 1, wherein each eccentric stepped-diameter hole comprises an outer recess, an eccentric, intermediate recess, and an inner recess.

3. The speed reducer of claim 2, wherein each outer gear assembly comprises a stepped diameter shaft disposed through both the eccentric, intermediate recess and the inner recess, a first bearing rotatably disposed on the stepped diameter shaft, and a second bearing rotatably disposed on the stepped diameter shaft and spaced from the first bearing, a gear train disposed on the outer recess, and internal teeth formed through the stepped diameter shaft and the gear train.

4. The speed reducer of claim 3, wherein the stepped diameter shaft comprises a rear gear section, a first shank section, a second shank section, an annular flange, a third shank section, and a fourth shank section; and wherein the first bearing is rotatably disposed on both the first and second shank sections, the second bearing is rotatably disposed on both the third and fourth shank sections, and the first and second bearings are spaced from each other by the annular flange.

5. The speed reducer of claim 4, wherein the gear train comprises a forward sleeve and a rear gear; wherein the internal teeth are disposed through the forward sleeve and the rear gear; wherein the rear gear is in gear mesh with the teeth; wherein the first, second, third and fourth shank sections are disposed in the inner recess, the fourth through hole, the second through hole, and one of the recesses; and wherein the outer recess is not completely covered by the rear gear.

* * * * *